(12) United States Patent
Monaci et al.

(10) Patent No.: US 9,320,113 B2
(45) Date of Patent: Apr. 19, 2016

(54) METHOD OF SELF-CALIBRATING A LIGHTING DEVICE AND A LIGHTING DEVICE PERFORMING THE METHOD

(71) Applicant: KONINKLIJKE PHILIPS N.V., Eindhoven (NL)

(72) Inventors: Gianluca Monaci, Eindhoven (NL); Oleg Belik, Eindhoven (NL); Tommaso Gritti, Breda (NL); Petrus Johannes Arnoldus Hubertus Kuijten, Deurne (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/433,060

(22) PCT Filed: Sep. 25, 2013

(86) PCT No.: PCT/IB2013/058844
§ 371 (c)(1),
(2) Date: Apr. 2, 2015

(87) PCT Pub. No.: WO2014/053954
PCT Pub. Date: Apr. 10, 2014

(65) Prior Publication Data
US 2015/0245445 A1    Aug. 27, 2015

Related U.S. Application Data

(60) Provisional application No. 61/710,236, filed on Oct. 5, 2012.

(51) Int. Cl.
*H05B 37/02* (2006.01)

(52) U.S. Cl.
CPC ........ *H05B 37/0218* (2013.01); *H05B 37/0227* (2013.01); *H05B 37/0272* (2013.01); *Y02B 20/46* (2013.01)

(58) Field of Classification Search
USPC .......... 315/149, 152, 153, 155, 360, 312, 324
See application file for complete search history.

(56) References Cited

U.S. PATENT DOCUMENTS

| 7,608,807 B2 * | 10/2009 | Hick | G01J 1/18 250/205 |
| 7,781,713 B2 * | 8/2010 | Papamichael | F21S 13/14 250/205 |

(Continued)

FOREIGN PATENT DOCUMENTS

| GB | 2377280 A | 1/2003 |
| JP | 2004288976 A | 10/2004 |
| JP | 2010055808 A | 3/2010 |
| WO | 2005018286 A1 | 2/2005 |
| WO | 2009040705 A2 | 4/2009 |
| WO | 2011073877 A1 | 6/2011 |

OTHER PUBLICATIONS

Norman Abramson, "The Aloha System—Another alternative for computer communications", AFIPS, vol. 37, Apr. 30, 1970, pp. 281-285.

*Primary Examiner* — Thuy Vinh Tran
(74) *Attorney, Agent, or Firm* — Meenakshy Chakravorty

(57) ABSTRACT

A method of self-calibrating a lighting device, comprising: —monitoring a calibration area, which encompasses at least a part of an area being illuminable by the lighting device; and—calibrating the light output settings of the lighting device. The monitoring operation includes repeating: —detecting any relevant change, out of a set of relevant changes comprising at least a light intensity change, in the calibration area during a monitoring time, while keeping the light output of the lighting device constant; and—determining an amount of change within the monitoring time; until the amount of change is below a limit value. Thereby the lighting device does not perform the calibration until it has detected a period of no or small changes.

12 Claims, 2 Drawing Sheets

(56) References Cited

U.S. PATENT DOCUMENTS

| | | | |
|---|---|---|---|
| 8,081,216 B2 * | 12/2011 | Cheung | H05B 37/0218 315/149 |
| 2006/0091822 A1 | 5/2006 | Bierman et al. | |
| 2006/0278808 A1 | 12/2006 | Hick et al. | |
| 2010/0244708 A1 | 9/2010 | Cheung et al. | |
| 2010/0259197 A1 | 10/2010 | Boleko Ribas | |
| 2011/0025919 A1 | 2/2011 | Vorontsov et al. | |
| 2011/0221350 A1 | 9/2011 | Staab | |
| 2011/0291564 A1 * | 12/2011 | Huang | F21V 23/0457 315/77 |
| 2014/0319318 A1 * | 10/2014 | Huang | H05B 33/0851 250/201.1 |
| 2015/0054412 A1 * | 2/2015 | Huang | F21V 23/0457 315/152 |

* cited by examiner

METHOD OF SELF-CALIBRATING A LIGHTING DEVICE AND A LIGHTING DEVICE PERFORMING THE METHOD

CROSS-REFERENCE TO PRIOR APPLICATIONS

This application is the U.S. National Phase application under 35 U.S.C. §371 of International Application No. PCT/IB2013/058844, filed on Sep. 25, 2013, which claims the benefit of U.S. Provisional Patent Application No. 61/710,236, filed on Oct. 5, 2012. These applications are hereby incorporated by reference herein.

FIELD OF THE INVENTION

The present invention relates to method of self-calibrating a lighting device, and a lighting device arranged to perform the method.

BACKGROUND OF THE INVENTION

Lighting systems are becoming increasingly intelligent to respond to a growing demand for personalization, efficiency and simplicity. In recent years lighting devices have been developed to address these demands. For example, the lighting device called LumiMotion, manufactured by Philips, includes a camera and a processing unit to detect the presence of a person close to the lighting device, and temporarily turn on the lighting device or increase its light output. When it is not trigged the lighting device is dimmed or fully turned off. Another example is a so called tuneable white lighting device, which enhances the look of illuminated products. The lighting device is arranged to determine appropriate settings by analyzing the colors of the illuminated products by means of image processing using an embedded camera and a processing unit. The appropriate settings are automatically chosen by the lighting device.

Thus, in general terms, lighting devices having sensing capabilities as described above, are designed to adapt their light output depending on the scene and situation they are observing. In order to infer accurate information about the scene and the influence of the lighting device itself, a calibration step is typically required. Relevant information to be acquired during the calibration can be for instance; spatial footprint of the light, amount and type of light provided in different parts of the scene, ambient illumination, scene layout and appearance, etc. In order to obtain this kind of information, different calibration strategies can be designed, but they are typically based on capturing one image of the scene with the light output of the lighting device turned off, and one image with the light output set to a predetermined value. However, there is a problem of changes in the scene during the calibration, e.g. caused by other nearby lighting devices carrying out calibration at the same time. As regards the impact of other lighting devices, it can be eliminated in a centrally controlled lighting system where the central controller calibrates one lighting device at a time with the others off. However, it is desired to provide an independent lighting device executing a self-calibration method which is less sensitive to disturbances in the scene, and which does not require the infrastructure associated with a centrally controlled lighting system.

SUMMARY OF THE INVENTION

It is an object of the present invention to provide a method of self-calibrating a lighting device, and a corresponding lighting device, which alleviate the above-mentioned problems of the prior art.

The object is achieved by a method according to the present invention as defined in claim 1, and by a lighting device according to the present invention as defined in claim 12.

Thus, in accordance with an aspect of the present invention, there is provided a method of self-calibrating a lighting device, comprising:
A) monitoring a calibration area, which encompasses at least a part of an area being illuminable by the lighting device, wherein said monitoring comprises repeating:
  i) detecting any relevant change, out of a set of relevant changes comprising at least a light intensity change, in the calibration area during a monitoring time, while keeping the light output of the lighting device constant; and
  ii) determining an amount of change within the monitoring time, until the amount of change is below a limit value; and
B) calibrating the light output settings of the lighting device only when the amount of change is below the limit value.

The advantage of this method is that the lighting device does not begin the calibration until there is no significant disturbance in the area which is used for the calibration. Disturbances such as other lighting devices performing a calibration are detected and avoided. This behavior is truly autonomous as well, and thereby there is no need for a common central controller in case of several lighting devices affecting each other.

In accordance with an embodiment of the method, the set of relevant changes includes detecting any movement of an object. Thus, in addition to changes due to different illumination of the calibration area, also movement of objects, which can affect the light settings, is considered.

In accordance with an embodiment of the method, the monitoring time is divided in time portions, which are separated in time. Thereby, flexibility is introduced in the monitoring operation.

In accordance with an embodiment of the method, said monitoring comprising capturing images of the calibration area and comparing the images with each other. This is an advantageous alternative of detecting changes since camera and image processing technique to be used for such a task is currently reliable and it is cheap as well.

In accordance with an embodiment of the method, said detecting any change is preceded by one of:
  randomly determining the monitoring time within a predetermined monitoring time interval; and
  determining the monitoring time by picking a next monitoring time of a predetermined sequence of monitoring times.

Any one of these alternatives provides for a high likelihood that the calibration of two or more lighting devices affecting each other, and being simultaneously turned on, will be separated in time.

In accordance with an embodiment of the method, time is divided into frames and the monitoring time is predetermined and encompasses at least one frame, and is moved ahead at least one frame for each repetition of said detecting any relevant change.

In accordance with an embodiment of the method, it comprises performing an initialization at power up of the lighting device before said monitoring. This initialization gives room for different initial actions.

In accordance with an embodiment of the method, the initialization comprises waiting a waiting period during which the light output of the lighting device is off. For instance, if the lighting device is the only one that has impact on the calibration area, or if there are several lighting devices, which are simultaneously turned on, then this embodiment enables for example determination of ambient light.

In accordance with an embodiment of the method, said initialization comprising setting a predetermined light output level and estimating an exposure time for images to be taken by the lighting device. Thereby a camera of the lighting device can be adapted to the present light conditions, thereby improving its performance.

In accordance with an embodiment of the method, said initialization comprising capturing an image while keeping the light output off. Thereby basic data of the illumination conditions can be obtained.

In accordance with an embodiment of the method, wherein said calibrating the light settings comprises:
   capturing a first image while keeping the light output off;
   capturing a second image with a predetermined light output;
   determining a light output setting on basis of the first and second images, and on basis of a predetermined light output template. Thereby basic image processing techniques are utilized.

According to another aspect of the present invention, there is provided a lighting device comprising:
   a control unit;
   at least one tuneable light source arranged to provide several different light output settings; and
   an optical sensor;
wherein the control unit is arranged to monitor, by means of the optical sensor, a calibration area, which encompasses at least a part of an area being illuminable by the lighting device, and to calibrate the light output settings of the lighting device; wherein the control unit, when monitoring the calibration area, is arranged to repeat:
   detecting, by means of the optical sensor, any relevant change, out of a set of relevant changes comprising at least a light intensity change, in the calibration area during a monitoring time, while keeping the light output of the lighting device constant; and
   determining an amount of change within the monitoring time;
until the amount of change is below a limit value.

The lighting device provides advantages corresponding to those of the method.

These and other aspects, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
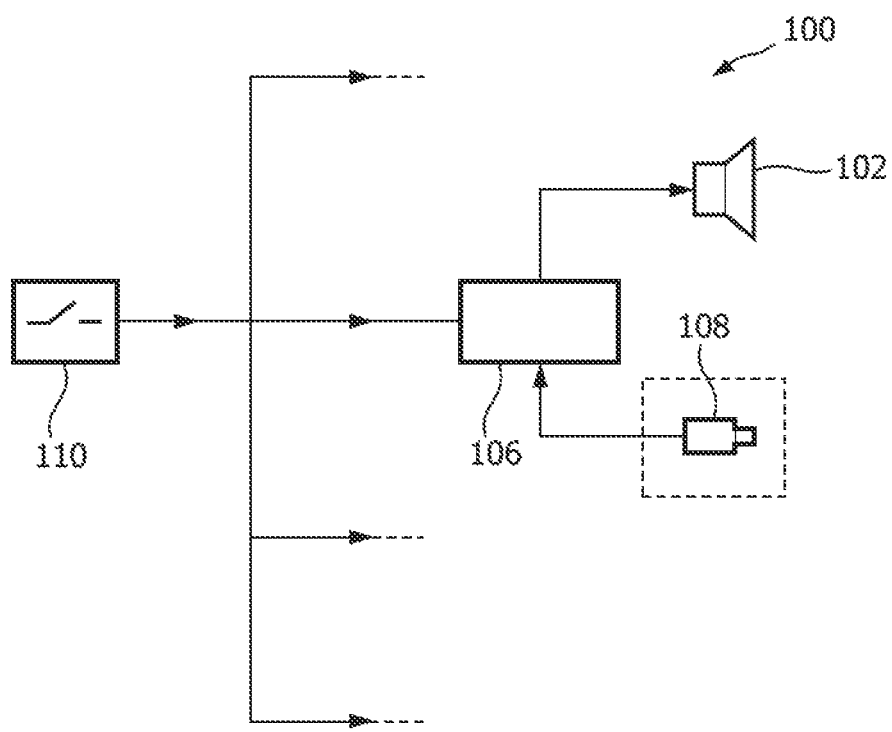
FIG. 1 is a block diagram of a lighting device according to an embodiment of the present invention.

According to an embodiment of a lighting device 100, for performing the present method, it comprises a light source 102, an optical sensor 104, and a control unit 106, as shown in FIG. 1. The optical sensor comprises a camera 108. The control unit 106 is connected with the light source 102 and the optical sensor 104.

Figure 3:
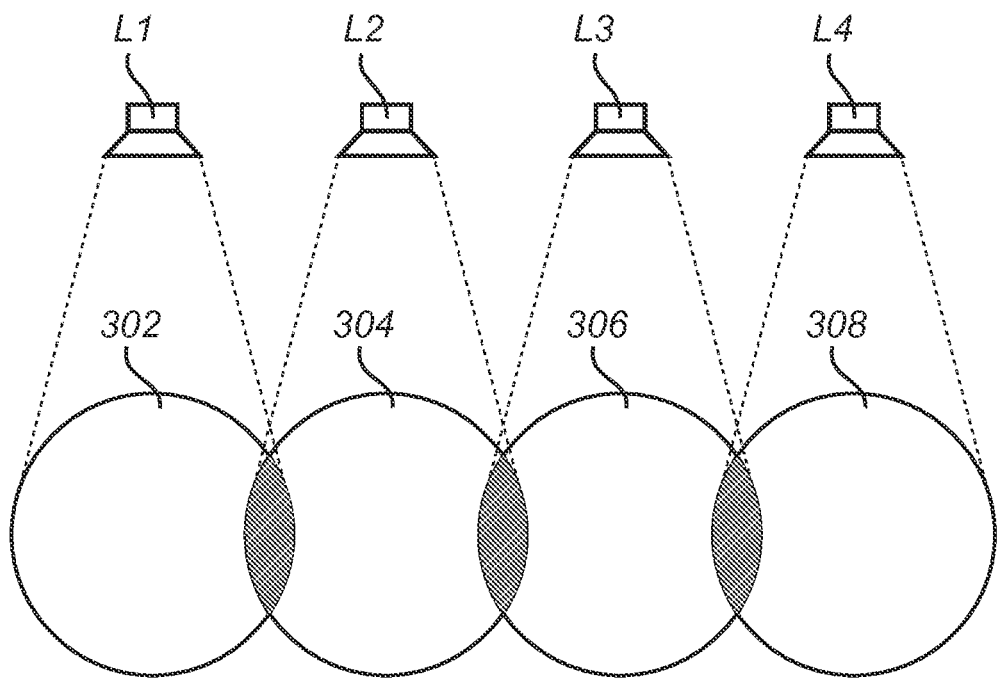
FIG. 3 illustrates illumination areas of an arrangement of several lighting devices according to FIG. 1.

According to an embodiment of the method of self-calibrating a lighting device, the method comprises the operations of monitoring a calibration area, which encompasses at least a part of an area being illuminable by the lighting device; and calibrating the light output settings of the lighting device. In this embodiment the calibration area corresponds with the illumination area of the lighting device 100, i.e. the area that is illuminated by the lighting device 100. FIG. 3 illustrates the illumination areas 302, 304, 306, 308 of four different, but similar, lighting devices. The calibration area, that is the area of the surroundings of the lighting device that is to be used as a basis for self-calibrating the lighting device 100, can differ from the illumination area 302, 304, 306, 308, and can be both larger and smaller, but it covers at least a part of the illumination area. In this example the calibration area corresponds with the illumination area, and the calibration area 302, 304, 306, 308 of each one of the four lighting devices L1, L2, L3, L4 is influenced by light coming from at least one of the other lighting devices. Furthermore, it is assumed that all four lighting devices 100 are powered by the same main switch 110, which is common in most environments where this kind of intelligent lighting is used, such as shops and outdoor environments, e.g. along roads and in parking lots, where at least a segment of the area are powered by the same main switch. Thus, all lighting devices L1-L4 can be powered at the same time.

Figure 2:
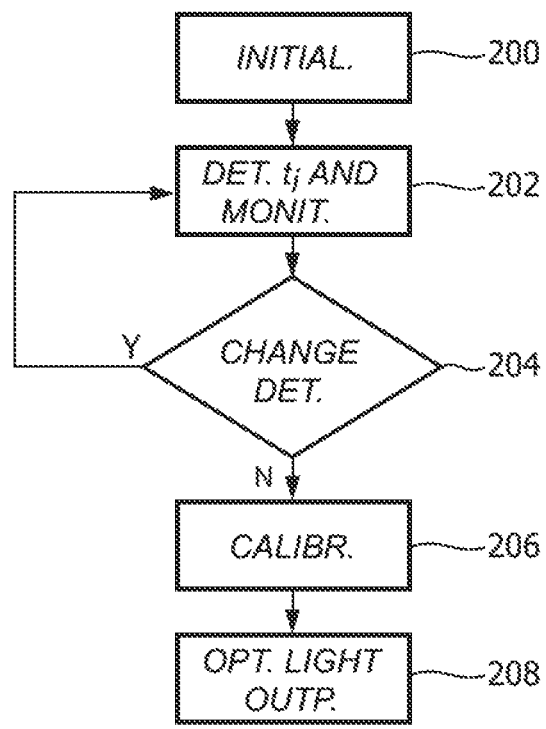
FIG. 2 is a flow chart of a method of self-calibrating the lighting device of FIG. 1, according to an embodiment of the present invention.

The operation of monitoring comprises repeating:
   detecting any relevant change, out of a set of relevant changes comprising at least a light intensity change, in the calibration area during a monitoring time, while keeping the light output of the lighting device constant, see box 202 in FIG. 2; and
   determining an amount of change within the monitoring time; until the amount of change is below a limit value, in box 204.

According to this embodiment, the monitoring time starts when the lighting devices are powered, and the lighting devices all have different monitoring times t1, t2, t3, and t4. There are different ways of determining the monitoring time, in box 202. One way is to determine, at powering, a random time within a time interval of an appropriate length. For instance, the monitoring time can range from a fraction of a second to a few seconds. Another way to determine the monitoring time is to determine the monitoring time by picking a next monitoring time of a predetermined sequence of monitoring times.

Figure 4:
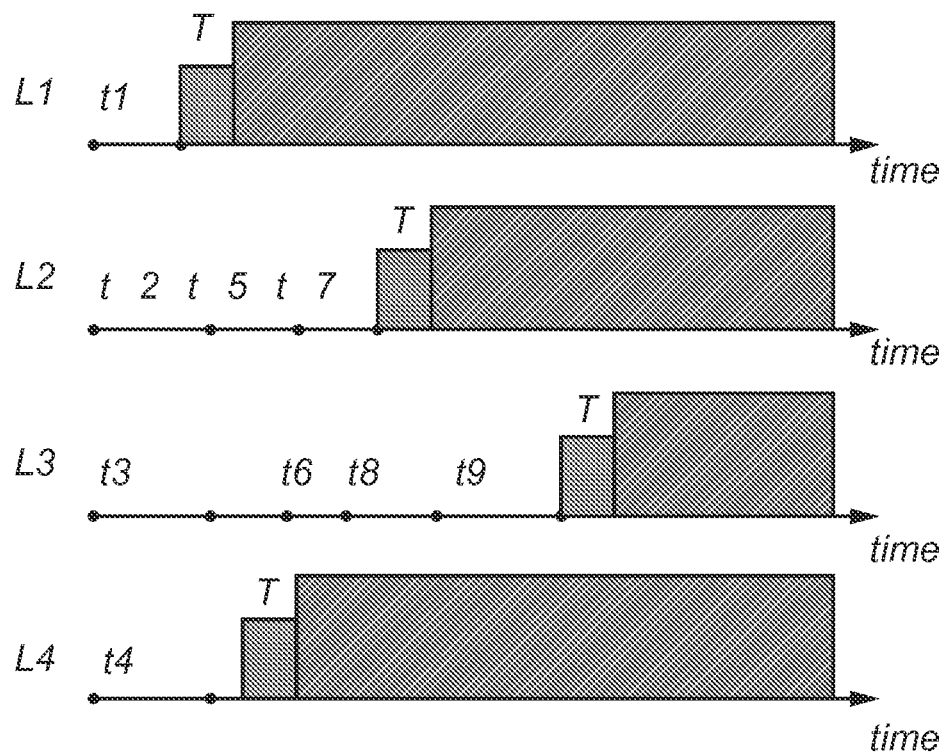
FIG. 4 is a time schedule illustrating an example of a self-calibration process with the lighting devices of FIG. 3.

At the end of the monitoring time, the lighting device performs a calibration operation, in box 206. However, only if there has been no significant change in the calibration area during the monitoring operation, as determined in box 204. This is explained by means of the exemplifying time schedule of FIG. 4 as follows. The first lighting device L1 has the shortest monitoring time t1. It is assumed that no significant change has occurred during t1. Then the first lighting device L1 starts the calibration operation at the end of t1 by turning its light off, or in this embodiment keeping its light off, as it has been turned off during the monitoring time, and capturing a first image with the camera 108 of its optical sensor 104. Then the first lighting device L1 sets its light output to a predetermined value and captures a second image. By means of image processing of the first and second images an appropriate light output, as regards for instance luminance and color temperature, is set. During this procedure, that is completed at time t1+T, where T is the calibration time, the light output of the first lighting device L1 has thus changed several times, at least two.

During the monitoring time t2, where t1<t2<(t1+T), of the second lighting device L2, it detects at least one change of the light output of the first lighting device L1, which influence a part of the calibration area 302 of the second lighting device L2. The control unit of the second lighting device L2 determines the amount of change of at least one of the changes to be significant, i.e. it is not below the limit. Therefore, the method returns to the operation of setting the monitoring time. A new monitoring time t5 is determined, and the monitoring is resumed. The fourth lighting device L4 has not detected any change during its monitoring time t4, where t4>t2. It is true that the light output of the first lighting device L1 has changed significantly during t4, but the light output of the first lighting device does not influence the calibration area 308 of the fourth lighting device L4. Thus, the amount of change is determined to be below the limit, by the control unit 106 of the fourth lighting device L4, and its control unit 106 continues with the calibration operation, and sets an optimal light output.

The third lighting device L3 has the longest monitoring time t3 of all of the lighting devices, in this example, and the calibration area 306 of the third lighting device L3 is influenced by the light output of both the second and the fourth lighting device L2, L4. During its monitoring time t3, the third lighting device L3 detects a significant change of the light intensity of its calibration area 306 due to at least one change of the light output of the fourth lighting device L4, and returns to determine a new monitoring time t6 and start monitoring again. Next event in time is the time out of the second monitoring time t5 of the second lighting device L2. During this time period, however, the first lighting device L1 was still calibrating and changed its light output significantly. Consequently, the second lighting device L2 resumes monitoring during a third time period t7. During that time period, the second monitoring time t6 of the third lighting device L3 ends, and it starts a third monitoring time t8, since a change of the light output of the fourth lighting device L4 was detected during its calibration. During the third monitoring time t8 of the third lighting device L3, the third monitoring time t7 of the second lighting device L2 ends, and it starts calibrating its light output. This calibration causes a change that is detected as a significant change by the third lighting device L3, which causes a fourth monitoring time t9 to be generated by the third lighting device L3. Then the third lighting device L3 calibrates its light output as well.

It should be noted than when using an optical sensor 104, which is a camera providing the possibility of exploiting spatial information, it is possible to give different weight to different parts of the calibration area. Thereby, for instance changes occurring in the most important part of the area can influence the determination more than corresponding changes in a less important portion of the calibration area.

The calibration operation is finished with setting an optimized light output value of the lighting device, in box 208.

As mentioned above, the calibration operation typically involves capturing a first image with the light output turned off, and capturing a second image with a predetermined light output, which can be a maximum light output level or some other appropriate level. The final setting is typically dependent on inter alia the ambient illumination. It should be noted that in the example above, when the second lighting device L2 performs the calibration, the final optimal light output setting of the first lighting device L1 contributes to the ambient illumination. Similarly, when the third lighting device L3 is self-calibrating the ambient illumination includes contributions from both the second and the fourth lighting devices L2, L4.

The monitoring operation, in this embodiment, involves sequentially capturing images during the monitoring time, and consecutively comparing a captured image with the previous image to detect any significant change. In addition to, or instead of, detecting a change of illuminance several other parameters are possible to monitor. Thus, according to another embodiment of the method, movement of an object within the calibration area is monitored as well. Concerning change detection strategies, generally a large number of options are available in the fields of image and video processing, and of computer vision. These options include, for instance, simple frame differencing, motion estimation, cross-correlation calculation, optical flow estimation, feature tracking, object detection and tracking, and many more.

Furthermore, different strategies for how the monitoring time is used are conceivable. Thus, according to another embodiment of the method, time is divided into frames, and the monitoring time encompasses at least one frame, and is moved ahead at least one frame for each repetition of detecting any relevant change. In other words, the detection of changes is performed every $N>1$ frames. As another option, a moving window of a number of frames k can be used, such that the control unit 106 continuously determines whether a significant change has occurred during the last k frames. If the answer is no, then the calibration operation is performed.

Furthermore, the limit between an insignificant change and a significant change can be adaptive. For example, the limit can be raised each time a significant change is detected, such that larger and larger changes are allowed with time passing. Other kinds of adaption are basing the limit on historic data, on image statistics, on user's input, on the time of the day the calibration is performed, etc.

Additionally, or as a part of another embodiment of the method, an initialization is performed at power up of the lighting device before said monitoring, in box 200. Thus, when the switch 110 is switched on, the lighting devices L1-L4 has an initial period available for different kind of preparations before the monitoring starts. According to different embodiments of the method, the initialization can be used for e.g. waiting a period during which the light output of the lighting device is off, which waiting period can be randomly determined. Additionally, during such a waiting period without light output, an image of the ambient illumination can be captured. Such an image is useful at the end of the calibration in order to discriminate not only between the own contribution to the illuminance and ambient illuminance, which may include a contribution from nearby lighting devices, but also to discriminate between the contribution of the basic ambient illuminance and contribution of other lighting devices. This information is valuable to infer the lighting system layout, to estimate and monitor ambient illumination that slowly changes over time, and in general to improve all vision based algorithms. As regards improving vision based algorithms, for instance the control unit will be able to discard changes caused by other lighting devices which modify their light output level.

Yet another alternative employment of the initialization operation is to set the lighting device, and thus all lighting devices to a predetermined light output level, e.g. a maximum light output, for some duration, and estimate an appropriate exposure time for the camera 108 in order for the camera 108 to be able to capture images without clipping. In this case the waiting time can be relatively long since some lighting devices has a long starting time before they emit at full brightness. Such lighting devices naturally have impact on other times as well, such as the calibration time, since they are generally slow in making large changes of light output.

Since the rapidness in changing the light output differs to a large extent between lighting devices of different types, and since the environment is different as regards changes in the calibration area, such as due to movement of objects like people or vehicles passing by, goods which are moved, etc., the user can be offered an opportunity to set the times or the character of the times.

Above embodiments of the lighting device and method of self-calibrating a lighting device according to the present invention as defined in the appended claims have been described. These should be seen as merely non-limiting examples. As understood by the person skilled in the art, many modifications and alternative embodiments are possible within the scope of the invention as defined by the appended claims.

It is to be noted that for the purposes of his application, and in particular with regard to the appended claims, the word "comprising" does not exclude other elements or steps, and the word "a" or "an" does not exclude a plurality, which per se will be evident to a person skilled in the art.

The invention claimed is:

1. A method of self-calibrating a lighting device, comprising:
   monitoring a calibration area, which encompasses at least a part of an area being illuminated by the lighting device (L1); and
   calibrating one or more light output settings of the lighting device;
   wherein said monitoring comprises repeating:
      detecting a relevant change, if any, out of a set of relevant changes comprising at least a light intensity change, in the calibration area during a monitoring time (t1), while keeping the light output of the lighting device constant;
      determining an amount of change within the monitoring time; and
      comparing the amount of change with a limit value;
   until the amount of change is below the limit value.

2. The method according to claim 1, said set of relevant changes comprising:
   detecting any movement of an object.

3. The method according to claim 1, wherein the monitoring time is divided in time periods, which are separated in time.

4. The method according to claim 1, said monitoring comprising capturing images of the calibration area and comparing the images with each other.

5. The method according to claim 1, wherein said detecting a relevant change is preceded by one of:
   randomly determining the monitoring (t1) time within a predetermined monitoring time interval; and
   determining the monitoring time by picking a next monitoring time of a predetermined sequence of monitoring times.

6. The method according to claim 1, wherein time is divided into frames and wherein the monitoring time (t1) is predetermined and encompasses at least one frame, and is moved ahead at least one frame for each repetition of said detecting a relevant change.

7. The method according to claim 1 further comprising:
   performing an initialization at power up of the lighting device (L1) before said monitoring.

8. The method according to claim 7, said initialization comprising:
   waiting a waiting period during which the light output of the lighting device is off.

9. The method according to claim 7, said initialization comprising:
   setting a predetermined light output level and estimating an exposure time for images to be taken by the lighting device.

10. The method according to claim 7, said initialization comprising:
    capturing an image while keeping the light output off.

11. The method according to claim 1, said calibrating comprising:
    capturing a first image while keeping the light output off;
    capturing a second image with a predetermined light output;
    determining a light output setting on basis of the first and second images, and on basis of a predetermined light output template.

12. A lighting device comprising:
    a control unit;
    at least one tunable light source arranged to provide one or more light output settings;
    wherein the control unit is arranged to monitor a calibration area, which encompasses at least a part of an area being illuminated by the lighting device, and to calibrate the one or more light output settings of the lighting device (L1);
    wherein the control unit, when monitoring the calibration area, is arranged to repeat:
       detecting a relevant change, if any, out of a set of relevant changes comprising at least a light intensity change, in the calibration area during a monitoring time, while keeping the light output of the lighting device constant;
       determining an amount of change within the monitoring time; and
       comparing the amount of change with a limit value;
    until the amount of change is below the limit value.

* * * * *